United States Patent [19]

Schläfer et al.

[11] 3,995,993
[45] Dec. 7, 1976

[54] PROCESS FOR THE DIFFERENTIAL DYEING OF POLYAMIDE FIBERS AND OF MATERIALS CONTAINING THEM

[75] Inventors: Ludwig Schläfer, Fischbach, Taunus; Maria Kàllay, Mammolshain; Johannes Jeths, Weiskirchen, all of Germany

[73] Assignee: Hoechst Aktiengesellschaft, Frankfurt am Main, Germany

[22] Filed: Aug. 20, 1975

[21] Appl. No.: 606,105

[30] Foreign Application Priority Data

Aug. 22, 1974 Germany .................... 2440207

[52] U.S. Cl. .................... 8/21 B; 8/41 B; 260/194; 260/199

[51] Int. Cl.[2] .................... D06P 3/82; C09B 29/30

[58] Field of Search ............ 8/41 B, 21 B; 260/199, 260/194

[56] References Cited

UNITED STATES PATENTS

| | | | |
|---|---|---|---|
| 2,999,731 | 9/1961 | Harding | 8/54 |
| 3,352,624 | 11/1967 | Harding et al. | 8/15 |
| 3,511,829 | 5/1970 | Armento | 260/199 |
| 3,755,290 | 8/1973 | de Montmollin | 260/196 |

OTHER PUBLICATIONS

Townend, J., Soc. Dyers and Colourists, June 1945, pp. 144–149.

Colour Index (Third Edition), vol. 4 (Soc. Dyers and Colourists), pp. 4102 and 4103.

*Primary Examiner*—Harry Wong, Jr.
*Assistant Examiner*—A. L. Clingman
*Attorney, Agent, or Firm*—Curtis, Morris & Safford

[57] ABSTRACT

It had been found that the dyestuff of the formula

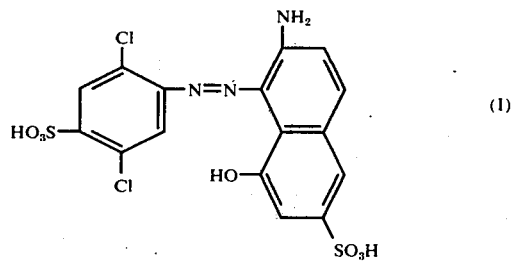

(I)

is very suitable in a differential dyeing process for the dyeing of polyamide fiber materials at a pH of 2 to 9; the dyestuff possesses a very good differentiating behavior and migrating behavior yielding dyeings of a high degree of evenness while it does not dye accompanying non-polyamide fibers, not even in traces.

3 Claims, No Drawings

PROCESS FOR THE DIFFERENTIAL DYEING OF POLYAMIDE FIBERS AND OF MATERIALS CONTAINING THEM

The present invention relates to a process for the differential dyeing of polyamide fibers and of materials containing them.

Dyeings and prints of textile fibers which show patterns with a contrast effect or multi-tone effects are very popular. Thus, for example, great popularity is found with color patterns consisting only in light and dark shades, as may be seen in plane materials, such as carpeting, where different light and dark sections of one and the same color alternate, or which are distinguished by multi-color patterns, optionally with a different depth of shade. Color patterns of this kind can be produced by common printing methods, however, they are fairly complicated, since they have to be produced according to common methods while using different printing pastes, for example those having a different dyestuff concentration, or different dyestuffs, and optionally, while applying a multi-stage printing process with an accurate registration of the repeat of pattern.

Moreover, fashionable bicolor effects, for example, are popular, which can be produced according to common methods by weaving fibers having been dyed differently, or by dyeing mixed fabrics with dyestuffs that are different as to their technical application, such as water-soluble dyestuffs and dispersion dyes. However, these methods are considered unfavorable, since the fiber finishing is generally performed advantageously at the end of the piece production, which process permits in particular to produce any shades and patterns at any time and does not require a previous dyeing of the fibers of yarns, or storage; also, the said methods are disadvantageous as they require different multi-stage dyeing methods, whereas a single dyeing method producing such patterns would allow a more elastic and economical operation and calculation and would also easily satisfy requirements with regard to time, for example, in view of fashion, since the change of a color shade or of a pattern by means of different colors could be effected in a relatively easy and fast manner with the finished piece, by choosing the dyestuffs and the concentration of the dye baths accordingly.

Thus, attempts have long since been made to simplify the then common dyeing and printing methods, with regard to new fashionable color patterns. This objective has finally been achieved by means of the so-called "differential dyeing" process, by which it is possible to dye piece goods in one and the same dye bath, or with the same dye liquor, in one- or two-phase manner, in the desired color and color shade patterns. This dyeing process requires that the materials used to be dyed consist of mixtures of fibers or of fibers having a different structure, which can be dyed differently, if suitable dyestuffs are chosen. However, one of the difficulties to obtain attractive and clear patterns is to be seen in the fact that many of the dyestuffs which have been available up to now, or which have been considered suitable for this process, do not completely meet the requirements, in that they soil for example accompanying fibers in an undesired manner, or in that they show a super-sensitive reaction to slight changes of the pH value of the dye bath, or by being strongly dependent, in their differentiated dyeing power, on the dyestuff concentration in the dye bath. However, in order to offer the dyer a broad spectrum of dyestuffs with an optimum use regarding their application and shading, it has been a desirable objective to find further dyestuffs showing the required advantages as compared against the dyestuffs used so far, or filling free spaces within this spectrum.

This task has been solved by the present invention.

The present invention provides the novel and advantageous application of a dyestuff according to the differential dyeing process, in particular a process for the differential dyeing of mixtures of natural and/or synthetic polyamide fiber materials having components which can be dyed in different depths of shade, or of mixtures of polyamide fiber materials consisting of those polyamide fiber materials which can be dyed in different depths of shade, with other natural and/or synthetic fiber materials, wherein, at a pH value of from 2 to 9, preferably from 4 to 8, the said fiber materials are dyed with an aqueous solution or dye paste containing the bluish red monoazo dyestuff of the formula (I)

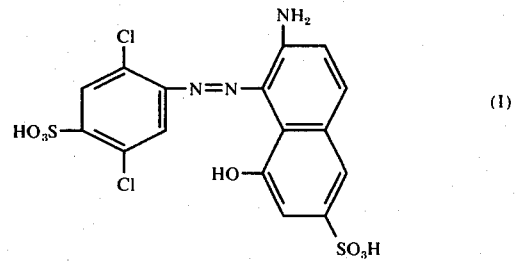

preferably in the form of its alkali metal salt, such as sodium or potassium salt, a. at a temperature in the range of from 60° to 150° C, preferably from 70° to 125° C, or b. are padded at room temperature or at an elevated temperature, suitably from 10° to 60° C, and subsequently steamed at a temperature in the range of from 100° to 150° C, preferably from 100° to 110° C.

As fiber mixtures that are suitable for this novel process, there are mentioned, for example:

Mixtures of wool fibers which can be dyed with a different depth of shade by acid dyestuffs, for example, also in the form of woven fabrics or knitted fabrics, fiber mixtures of wool and synthetic polyamide fibers, fiber mixtures of natural silk and synthetic polyamide fibers, fiber mixtures, for example also in the form of mixed woven fabrics or mixed knitted fabrics, of polyamide-(6), polyamide-(66) and polyamide-(11) fibers, in particular fiber mixtures, for example in the form of textile fabrics, such as woven fabrics, knitted fabrics, knitted goods and carpet materials, of fiber types of synthetic polyamide-(6), polyamide-(66) and polyamide-(11) which can be dyed with a different depth of shade by acid dyestuffs, said polyamides being distinguished by the number of reactive amino end groups in the molecules that are responsible for the capacity to pick up acid dyestuff molecules, and of fibers of synthetic polyamides which can be dyed by basic dyestuffs, the polyamides being obtained, for example, by superposition and blocking of the reactive amino end groups of the polyamide molecules by way of suitable compounds, such as sulfoisophthalic acid, moveover, fiber mixtures, for example also in the form of textile fabrics or woven fabrics or knitted fabrics, of the above-mentioned fiber materials with other natural and/or synthetic fibers, such as polyester, polyacrylonitrile and cellulose fibers.

Fiber mixtures and fiber materials of this kind have been known, for example, from "Melliand Textilberichte", edition 1970, pgs. 1189 – 1197, and from the pattern card No. S 8163 ("polyamide carpets") of the Farbwerke Hoechst Aktiengesellschaft, also from German Auslegeschrift No. 1 170 638 and U.S. Pat. Nos. 3,235,533, 3,142,662, 3,039,990 and 3,184,436, 3,328,341 and 3,467,484, as well as German Offenlegungsschrift No. 1,694,164.

The manufacture of polyamide fibers which can be dyed with a different depth of shade can be effected by chemical means, for example, according to German Offenlegungsschrift No. 1,694,164, by increasing the number of the amino groups of the polyamide molecules by adding varying amounts of polyamines, which results in an improved capacity of being dyed by acid dyestuffs of the polyamide fibers, or on the other hand, by decreasing the number of the amino groups of the polyamide molecules, according to U.S. Pat. No. 3,328,341, by adding butyrolactone during the preparation of the polyamides, which is also performed, however, by adding varying amounts of carboxylic acids, and which results in a decreased capacity of being dyed of the fibers.

Finally, by adding aromatic diamines carrying a sulfonic acid group, according to U.S. Pat. Nos. 3,142,662, 3,039,990 and 3,184,436, the dyeing character of the polyamides can be converted during their preparation, by which process all amino groups are blocked and the polyamide molecules as the active dyeing groups carry only acid radicals, i.e. they can only be dyed with basic dyestuffs (cross-dyeing polyamides).

It is also possible to improve the capacity of being dyed with acid dyestuffs of polyamide fibers by purely physical means, for example by a treatment with solvents, for example with benzyl alcohol according to U.S. Pat. No. 3,467,484, or by way of suitable spinning and knitting processes.

The dyeing behavior and the technical utilization of polyamide fibers which can be dyed with a different depth of shade has been described, for example, in Melliand Textilberichte, edition 1970, pgs. 1189 – 1197, and in the pattern card No. 8163 (polyamide carpets) of the Farbwerke Hoechst Aktiengesellschaft.

The application of the dyestuff of the formula (I) on the above-mentioned fiber materials can be effected while using the technically common dyeing auxiliaries, and the said dyestuff yields on polyamide fibers to be dyed with acid dyestuffs clear bluish red dyeings of a very different depth of shade, depending on the polyamide fiber type present, already a very light color shade having an excellent fastness to light.

Besides, the dyeings show a good fastness to rubbing, a good fastness to sea water and to water (according to DIN 54006). Due to its good migration behavior, the dyestuff of the invention yields very even dyeings on the individual polyamide fiber types.

The dyestuff of the formula (I) shows, with a good build-up, an excellent differentiating behavior from the acid to the alkaline pH range, due to which the desired strong differences in the depth of shade are obtained in a constant manner for the individual polyamide fiber types specified above, also in the pH range between 4 and 8. Owing to this property, the application of the dyestuff is facilitated, in particular in the case of the continuous batchwise exhaustion methods, wherein the dye bath has to be constantly made up, depending on the consumption, and its pH value needs to be controlled and corrected all the time, in order to obtain the desired effect, namely, the different dyeing of the individual types of fiber.

If the dyestuff of the formula (I) is used for the dyeing of polyamide or polyamide fiber-containing materials comprising fibers to be dyed by cationic dyestuffs and/or polyester fibers, the latter remain undyed in all cases. Due to its good compatibility with other dyestuffs, the dyestuff of the formula (I) can be used together with dyestuffs of other types, for example, with dispersion dyestuffs and/or basic dyestuffs. In order to adjust special color shades, the dyestuff may also be combined with further acid dyestuffs.

The bluish red monoazo dyestuff of the formula (I) used according to the invention can be prepared by coupling equal molar amounts of diazotized 2,5-dichloroaniline-4-sulfonic acid of the formula (II)

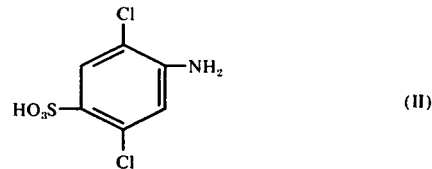

and 2-amino-8-naphthol-6-sulfonic acid of the formula (III)

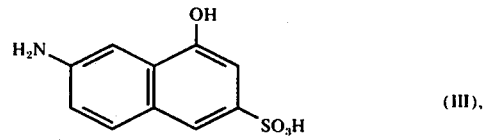

at a pH value in the range of from 1 to 4. It can be obtained by being salted out of the reaction solution or by evaporation or spray-drying of this coupling solution.

In the differential dyeing process the dyestuff used in the process of the invention shows a good color build-up even up to the slightly alkaline pH range, in particular up to about pH=8, as compared against the dyestuffs C.I. Acid Red 37 with the C.I. No. 17 045 and C.I. Acid Red 42 with the C.I. No. 17 070 known from "Colour Index", and it also has a very good differentiating behaviour, i.e. it can yield dyeings having wide differences in the depth of shade, depending on the type of polyamide fiber, while leaving a complete share of undyed polyester and cellulose portions of the fiber mixture possibly present which can be dyed only with cationic dyestuffs. Furthermore, the migrating behaviour of the dyestuff to be used according to the invention is superior to that of C.I. Acid Red 42, which results in a high degree of evenness of the dyeings obtained with the dyestuff used according to the invention. Streaky or otherwise irregular dyeings on the individual types of polyamide fiber have not been observed. Moreover, the dyestuff used according to the invention shows an excellent fastness to light, already with dyeings of a very light color shade, as compared against the dyestuffs C.I. Acid Red 37 and 42.

The following Examples serve to illustrate the use of the dyestuff of the formula (1) in accordance with the invention. The parts by weight are to the parts by volume as is the gram to the ccm.

EXAMPLE 1

0.66 Part by weight of the dyestuff of the formula (I) was dissolved in 1000 parts by volume of water and was mixed with 1 part by volume of acetic acid of 60% strength. 4 Hanks of a polyamide carpet yarn were given into this bath, the hanks comprising 8 parts by weight each of a light dyeing type of polyamide fiber, a regular dyeing type, a deep dyeing type, as well as a type of polyamide fiber that could not be dyed with acid dyestuffs. The yarn was dyed for 1 hour at a temperature in the range of from 70° to 95° C at a pH value of from 4 to 4.5, and the dyed hanks were washed with cold water. According to this operating method, the same dye bath yielded fibers dyed with very different shades of red, as well as a fiber portion which had not been dyed at all. Already at the lightest color shade, the dyeings showed an excellent fastness to light, a good fastness to rubbing, a good fastness to sea water, a good fastness to water according to DIN 54006, and a high evenness due to the good migration behavior of the dyestuff.

As a light dyeing type of polyamide fiber there is used, in the present case, for example the fiber of duPont labelled nylon 66-type 845, as a regular or normal dyeing type, for example the fiber of duPont labelled nylon 66-type 846, and as a deep dyeing type, for example the fiber of duPont labelled nylon 66-type 847.

EXAMPLE 2

The dye bath of Example 1 was made up again with water to 1000 parts by volume, and 0.66 part by weight of the dyestuff of the formula (I) was added. The same material was dyed in this bath as was used in Example 1. The result of the dyeing process was identical with that of Example 1. This Example could be repeated as often as necessary, but still the strong difference in color intensity of the individual types of fiber, as well as the white color of the type of fiber which could not be dyed with acid dyestuffs remained the same.

EXAMPLE 3

0.66 Part by weight of the dyestuff of the formula (I) was dissolved in 1000 parts by weight of water and was mixed with 0.6 part by weight of monosodium phosphate and 1.6 parts by weight of trisodium phosphate. Again 4 hanks of polyamide carpet yarn were dyed with the pH value being established at 8, as has been described in Example 1, during one hour and at a temperature of from 70° to 95° C. The result was the same as the one described in Example 1.

EXAMPLE 4

0.66 Part by weight of the dyestuff of the formula I was dissolved in 1000 parts by weight of water and was mixed with 0.6 part by weight of monosodium phosphate and 1.6 parts by weight of tri-sodium phosphate. 33 Parts by weight of a polyamide carpet material comprising a light dyeing type of polyamide fiber, a regular dyeing type, a deep dyeing type, as well as a type of fiber which could not be dyed at all with acid dyestuffs, were dyed for one hour with the pH value being established at from 7.5 to 8. After this treatment the material showed undyed portions as well as portions with a red dyeing of a very different depth of shade. Already at the lightest color shade, the dyed fiber portions showed an excellent fastness to light, a good fastness to rubbing, a good fastness to sea water, as well as a good fastness to water according to DIN 54006.

EXAMPLE 5

A dye bath was prepared while using 0.66 part by weight of the dyestuff of the formula (I), 1000 parts by volume of water and 1 part by volume of 60% acetic acid, and the carpet material used in Example 4 was dyed for one hour at a temperature of from 70° to 95° C, with the pH value being established at 4 to 4.5. The dyeing result was the same as the one described in Example 4.

EXAMPLE 6

In a dye bath consisting of 0.8 part by weight of the dyestuff of the formula (I), 1000 parts by volume of water and 1 part by volume of acetic acid of 60% strength, 4 hanks of 10 parts by weight each of a polyamide endless yarn were dyed at 95°C for 1 hour, the yarn comprising a light dyeing type of fiber, a regular dyeing type, a deep dyeing type, as well as a type of fiber that could not be dyed at all with acid dyestuffs. The yarn hanks thus obtained showed after the rinsing and drying processes a bluish red dyeing of a very different depth of shade. The hank which could not be dyed with acid dyestuffs remained completely undyed. The dyeings showed the good fastness properties described in Example 1 and a high evenness which was to be attributed to the good migration behavior of the dyestuff.

EXAMPLE 7

Tufted carpet material containing polyamide fibers with a different affinity towards acid dyestuffs was impregnated with 4 to 5 times the amount by weight of an aqueous padding liquor containing in 100 parts by weight 1 part by weight of the dyestuff of the formula (I), 0.1 part by volume of acetic acid of 60% strength, 0.3 part by weight of a wetting agent on the basis of alkylpolyglycolether, as well as 0.4 part by weight of a thickening agent on the basis of starch ether. The fabric was steamed for 5 minutes at a temperature in the range of from 100° to 103° C and was washed with warm water. The dyed tufted carpet material showed a clear bluish red dyeing of a very different depth of shade. The portion of polyamide fibers to be dyed with basic dyestuffs remained completely undyed. The dyeing showed the good fastness properties which have been described in Example 1.

EXAMPLE 8

A dye bath was prepared by using 0.33 part by weight of the dyestuff of the formula (I) in 1000 parts by weight of water, 0.5 part by weight of a levelling agent on the basis of a condensation product of cyanuric chloride and aniline-sulfonic acid, 0.2 part by weight of a textile auxiliary on the basis of an oxethylated fatty amine and 2 parts by weight of monosodium phosphate. At a temperature of 70° C, 33 parts by weight of a woven fabric were given into this dye bath, the fabric comprising several types of polyamide fiber which could be dyed with a different depth of shade, and the material was dyed for 1 hour at 70° C while being moved well in the dye liquor. The fabric was then removed from the dye bath and was washed with cold water. A fabric was obtained which was dyed bluish red in several depths of shade which were strongly different from one another. If the fabric contained a portion of polyamide fibers that could not be dyed with acid dyestuffs, this portion remained completely undyed according to the dyeing process described. This dyeing had an excellent fastness to light even in the lightest shades and also showed the other good fastness properties already described.

EXAMPLE 9

At a temperature of 70° C, 0.66 part by weight of the dyestuff of the process of the invention and 0.34 part by weight of the dyestuff C.I. Basic Yellow 21 were dissolved in a dye bath consisting of 1000 parts by volume of water, 0.5 part by weight of a dispersing agent on the basis of an oxethylated condensing product on the basis of cresol and camphene. After 33 parts by weight of a fabric and had been added, which fabric consisted of several types of polyamide fiber which could be dyed with acid and cationic (basic) dyestuffs, the suitable pH value was adjusted by adding 0.5 part by volume of acetic acid of 60% strength and 1 part by weight of sodium acetate, and the material was dyed for 1 hour at from 90° to 95° C. The after-treatment of the dyeing was effected by rinsing with warm and cold water and drying.

A fabric was obtained which showed a bluish red dyeing of a very different depth of shade, the portion of fibers which could be dyed with basic dyestuffs having a clear yellow color shade. The red dyeing showed the good fastness to light described in the above Examples.

EXAMPLE 10

A dye bath was prepared as has been described in Example 5, and 33 parts by weight of a mixture of polyamide-6, polyamide-66 and polyacrylonitrile fibers were dyed in this liquor. In this case, too, bluish red shades of a different color intensity were obtained on the two types of nylon fiber, as well as a clear yellow dyeing on the polyacrylonitrile fibers.

EXAMPLE 11

10 Parts by weight of a mixture of wool fibers having an increased dyestuff pick-up capacity and normal untreated wool fibers were placed into a dye bath consisting of 0.3 part by weight of dyestuff of the formula (I), 250 parts by weight of water and 0.3 part by weight of acetic acid of 60% strength, were heated at 70° C for 30 minutes, while being moved well in the bath, and were dyed for 1 hour at this temperature. The fiber mixture was then removed from the dye bath, was rinsed with warm water and dried. A mixture of 2 types of wool fiber which had been dyed in a bluish red with different depths of shade were obtained, the dyeing showing a good fastness to light.

EXAMPLE 12

10 Parts by weight of a knitted material consisting of wool, silk and polyamide-66 fibers were dyed in a dye bath of 250 parts by weight of water and 0.3 parts by weight each of the dyestuff of the formula (I) and of acetic acid of 60% strength, for 1 hour at 60° C, while being moved well in the liquor. The dyed material was rinsed with warm water and dried. In this case, too, the individual types of fiber were dyed in a clear red color shade of a strongly different depth.

EXAMPLE 13

A carpet material of polyamide fibers having a different affinity towards acid dyestuffs was impregnated with 5 times the amount by weight of an aqueous dye bath containing in 1000 parts by weight, 10 parts by weight of the dyestuff of the formula (I), 1 part by volume of acetic acid of 60% strength, 3 parts by weight of a wetting agent on the basis of alkylpolyglycol ether as well as 4 parts by weight of a thickening agent on the basis of starch ether. The material was subsequently steamed for 5 minutes at a temperature of from 100° to 103° C with saturated steam and was then washed with cold water.

A material was obtained which was dyed in a clear bluish red color of strongly different depths of shade, the portion of fibers to be dyed with basic dyestuffs having largely remained undyed.

EXAMPLE 14

The polyamide material used in Example 13 was impregnated with 5 times the amount by weight of the padding liquor described therein, to which also 10 parts by weight of C.I. Basic Yellow 21 as well as one part by weight of a dispersing agent (an oxethylated condensation product on the basis of cresol and camphene) had been added, and the material was also steamed for 10 minutes. Subsequently the fabric was rinsed with water and dried. A fabric was obtained which was distinguished from the one treated according to Example 13 by the fact that those portions which remained undyed in the former case now showed an intensive yellow dyeing.

EXAMPLE 15

The carpet material on the basis of polyamide fibers which had been used in Example 13 was impregnated with 4 to 5 times the amount by weight of a padding liquor containing in 1000 parts by weight of liquor, 10 parts by weight of the dyestuff of the formula (I), 5 parts by weight of C.I. Acid Red 42, 4 parts by weight of a thickening agent on the basis of cellulose ether, and 2 parts by weight of monosodium phosphate. For the fixation of the dyestuffs, the impregnated fabric was steamed for 8 minutes and was subsequently washed and dried. After this treatment the mixed fabric showed a red dyeing of different depths of shade, and even the portion of fibers which could not be dyed with acid dyestuffs showed some traces of red. This unfavorable effect was to be attributed to the use of the dyestuff Acid Red 42 in the padding liquor, as was found by a comparison with Example 13.

EXAMPLE 16

0.5 Part by weight of the dyestuff of the formula (I), 0.5 part by weight of C.I. Acid Red 42, 0.5 part by weight of acetic acid of 60% strength and 1 part by weight of sodium acetate were made up to 1000 parts by weight with water having a temperature of 70° C. 4 Hanks of polyamide staple fibers of 8 parts by weight each were dyed in this dye bath, which fibers had a different affinity (capacity of being dyed) towards acid dyestuffs, while one type of fiber was not to show any affinity at all. The hanks were dyed for 1 hour at a temperature of from 90° to 95° C while being moved well in the liquor and subsequently they were washed. Thus, a dyeing of different depths of shade was obtained on all types of polyamide fiber, in which process the type of fiber not to be dyed with acid dyestuffs also showed traces of dyeing. This unfavorable effect was a consequence of the use of the dyestuff C.I. Acid Red 42, which could be seen by comparing this result with that of Example 1.

EXAMPLE 17

A dye liquor was prepared which contained 1 part by weight of the dyestuff of the formula (I), 1.6 parts by weight of trisodium phosphate, 0.65 part by weight of monosodium phosphate, 0.75 part by weight of a textile auxiliary on the basis of oxethylated fatty amines and 996 parts by weight of water. In this bath, 3 hanks of polyamide carpet yarn were dyed for 60 minutes (at pH 8) at a temperature of from 90° to 95° C, the hanks having 11 parts by weight each of fibers with a modified dyestuff pick-up capacity, i.e. the light dyeing type, the regular dyeing type, as well as the deep dyeing type of fiber were chosen.

At the end of the normal dyeing time the hanks were removed from the bath, and each hank as well as the amount of dye bath were divided in half. One half of each hank was rinsed and dried. The other half was given again into the dye bath and was dyed for another hour at 90° to 95° C, after 0.5 part by weight of C.I. Acid Red 37 had been added, and was then rinsed and dried. The comparison of the two halves of each hank showed that there was practically no difference as to the depth of shade and the color of the two corresponding halves of each hank. This example showed that under the dyeing conditions chosen (pH value of about 8) the dyestuff C.I. Acid Red 37 was in no way more appropriate for the dyeing of polyamide fibers than the dyestuff of the invention.

EXAMPLE 18

An aqueous dye bath was prepared which contained the following components in 1000 parts by weight:
0.66 Part by weight of the dyestuff of the invention,
1 part by weight of a dispersing agent on the basis of a condensation product of naphthalene-sulfonic acid and formaldehyde,
0.5 part by weight of a levelling agent on the basis of an oxethylated fatty amine,
0.5 part by weight of acetic acid of 60% strength and
1 part by weight of sodium acetate.

33 Parts by weight of a mixed fabric of polyester fibers and polyamide-66 fibers were dyed in this liquor in a closed dyeing vessel for 15 minutes at 125° C, the polyamide-66 fibers consisting of fibers which could be dyed in a regular as well as a very intensive color shade with acid dyestuff. A mixed fabric was obtained which showed a clear bluish red dyeing in two different depths of shade and, besides, also undyed fiber portions. The fabric was now divided into 2 parts, 0.33 part by weight of C.I. Disperse Yellow 64 was added to the dye liquor, and the material was dyed for another 20 minutes at 125° C. A fabric was obtained which showed a neutral red dyeing in two different depths of shade, besides those portions which had been dyed purely yellow.

The same result was obtained in a single step, if the mixed fabric was dyed with a mixture of the two dyestuffs mentioned above at the same time, at a temperature of from 125° to 130° C.

EXAMPLE 19

A mixed fabric on the basis of polyamide fibers having a different dyestuff pick-up capacity and cellulose fibers was impregnated with 3 times the amount of an aqueous padding liquor containing in 1000 parts by weight, 10 parts by weight of the dyestuff of the invention, 5 parts by weight of C.I. Direct Yellow11 (C.I. No. 40 000), 5 parts by weight of a cotton mordant on the basis of stoved phenol, 4 parts by weight of a thickening agent on the basis of cellulose ether, and 1.6 parts by weight of tri-sodium phosphate and 0.6 part by weight of monosodium phosphate. The fixation of the dyestuffs was effected by steaming the fabric for 15 minutes at a temperature of from 100° to 103° C. The steamed fabric was rinsed with warm water and was soaped and dried. A mixed fabric was obtained, the polyamide portion of which showed a bluish red dyeing in different depths of shade, whereas the cellulose fiber portion had been dyed yellow.

EXAMPLE 20

A dye bath was prepared which contained 0.5 part by weight of C.I. Reactive Yellow 15, 2 parts by weight of trisodium-phosphate and 5 parts by weight of sodium sulfate in 100 parts by weight. 10 Parts by weight of a mixed fabric comprising polyamide and viscose staple fibers which could be dyed with a different depth of shade were dyed in this bath for 1 hour at a temperature of from 60° to 70° C. Subsequently the pH value of the dye bath was adjusted to become slightly acid by means of acetic acid of 60% strength, 0.5 part by weight of the dyestuff of the formula (I) was added, and the dyeing was continued for another hour at 60° to 70° C. A fabric was thus obtained, whose viscose staple fiber portion had been dyed in a yellow color shade, and the polyamide portion of which had been dyed in different shades of red.

EXAMPLE 21

A mixed fabric comprising polyamide fibers which could be dyed by acid dyestuffs with light and deep color shades, and polyacrylonitrile fibers was impregnated with three times the amount by weight of an aqueous padding liquor containing — in 1000 parts by weight of liquor — 10 parts by weight of the dyestuff of the formula (I), 10 parts by weight of C.I. Basic Yellow 21, 3 parts by weight of a wetting agent on the basis of alkylpolyglycolether, 1 part by weight of a dispersing agent on the basis of an oxethylated condensing agent on the basis of cresol and camphene, 4 parts by weight of a thickening agent on the basis of starch ether, as well as 2 parts by weight of monosodium-phosphate. The fabric was then steamed at a temperature of from 100° to 103° C. A fabric was obtained, the polyamide portion of which had been dyed in two different shades of a bluish red, and whose polyacrylonitrile portion had been dyed in an orange red shade.

EXAMPLE 22

0.66 Part by weight of the dyestuff of the formula (I) was dissolved in 1000 parts by volume of water and mixed with 1 part by volume of acetic acid of 60% strength. 3 Hanks of polyamide endless yarn were given into this bath, the hanks comprising 11 parts by weight each of the types of fiber of polyamide 6, 66 and 11; the bath was heated to 95° C, and the material was dyed for one hour at a pH value of from 4 to 4.5 while being moved well in the liquor. Subsequently the dyeings were washed with cold water.

According to this method of operation, the same dye bath yielded fibers with a red dyeing of a different depth of shade, the polyamide-6 type of fiber showing the deepest color shade, whereas the polyamide-11 type of fiber only had a slight shade of color. The polyamide-66 type of fiber showed a medium depth of shade.

EXAMPLE 23 a. A dye bath was prepared which consisted of 600 ml of water, 0.1 g of the dyestuff of the formula (I), 0.4 g of a commercial textile auxiliary on the basis of a condensation product of cyanuric chloride and aniline-sulfonic acids as well as 0.06 g of a textile auxiliary of a long-chain aliphatic primary amine and ethylene oxide, and 2 hanks of nylon-(66) carpet yarn having 10 g each of the types 846 and 847 (regular dyeing and deep dyeing nylon from Du Pont) were dyed in the said bath for 1 hour at 95° C. During the entire dyeing process, a pH value of 6.5 was maintained by way of the buffer system of mono-and disodium-phosphate.

Subsequently the dyeings were rinsed with warm water and were dried at the air. The two hanks thus dyed showed a wide difference in color intensity.

b. If the dyeing was carried out according to the same method as described under *a* above, however, while using 0.1 g of the dyestuff Acid Red 42 instead of the dyestuff of the formula (I), two differently dyed yarn hanks were also obtained, but the difference in color depth was not nearly as wide as in the above case.

This Example shows clearly that the differentiating capacity of the dyestuff used according to the invention on differential-dyeing nylon was markedly superior to that of Acid Red 42.

We claim:

1. A process for the differential dyeing of mixtures of natural or of synthetic or of natural and synthetic fiber materials of polyamides having components which can be dyed in different depths of shade, or of mixtures of the said polyamide fibers which can be dyed in different depths of shade, with other natural of synthetic fibers, which comprises dyeing the said fiber material at a temperature of from 60° to 150° C with an aqueous solution or paste containing the monoazo dyestuff of the formula

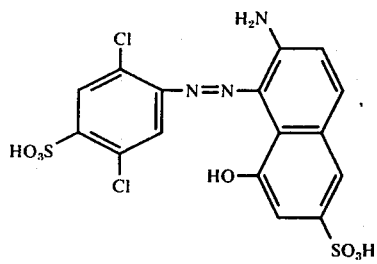

or padding the said fiber material at a temperature in the range of from 10° to 60° C and subsequently steaming at a temperature of from 100° to 150° C, each at a pH-value of 2 to 9.

2. A process as claimed in claim 1, which is carried out at a pH in the range of from 4 to 8.

3. Fiber materials which have been dyed according to the process of claim 1.

* * * * *